United States Patent
Chen et al.

(10) Patent No.: US 10,218,204 B2
(45) Date of Patent: Feb. 26, 2019

(54) CHARGING SYSTEM ON CONSTANT CURRENT MODE AND METHOD THEREOF

(71) Applicant: PHIHONG TECHNOLOGY CO., LTD., Taoyuan (TW)

(72) Inventors: Chun-Chen Chen, Taoyuan (TW); Jian-Hsieng Lee, Tainan (TW); Ying-Chieh Yeh, Tainan (TW); Hsiao-Tung Ku, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 103 days.

(21) Appl. No.: 15/613,295

(22) Filed: Jun. 5, 2017

(65) Prior Publication Data

US 2018/0191171 A1    Jul. 5, 2018

(30) Foreign Application Priority Data

Jan. 3, 2017   (TW) .............................. 106100078 A

(51) Int. Cl.
*H02J 7/00* (2006.01)
*H02J 1/10* (2006.01)
*H02J 7/04* (2006.01)

(52) U.S. Cl.
CPC ................ *H02J 7/007* (2013.01); *H02J 1/10* (2013.01); *H02J 7/0077* (2013.01); *H02J 7/045* (2013.01); *H02J 2007/0096* (2013.01)

(58) Field of Classification Search
USPC ......................................................... 320/121
See application file for complete search history.

(56) References Cited

U.S. PATENT DOCUMENTS

| 5,969,505 A | * | 10/1999 | Okamura | ................ | H02J 7/345 |
| | | | | | 320/122 |
| 2004/0189251 A1 | * | 9/2004 | Kutkut | ................... | H02J 7/022 |
| | | | | | 320/128 |
| 2016/0276844 A1 | * | 9/2016 | Gekinozu | ................ | H02J 7/04 |

* cited by examiner

*Primary Examiner* — Samuel Berhanu
(74) *Attorney, Agent, or Firm* — Chih Feng Yeh; Huntington IP Consulting Co., Ltd.

(57) ABSTRACT

A charging method on constant current mode includes communicating with a rechargeable battery by a central control module to obtain a first current and a first voltage required to charge the rechargeable battery; receiving a first current output instruction and a first voltage output instruction by first and second charging modules; outputting a second voltage and a second current to the rechargeable battery and transmitting an output value of the second voltage and an output value of the second current to the central control module by the first charging module; and when the central control module detects that difference between the output value of the second voltage and the first voltage is smaller than a predetermined voltage value, transmitting a fourth current output instruction, in which a fourth current equals the first current minus a predetermined current value, to the first charging module by the central control module.

13 Claims, 4 Drawing Sheets

300

Step 302: the central control module communicates with the rechargeable battery to obtain the first current and the first voltage required to charge the rechargeable battery Step 304: the central control module transmits a first current output instruction and a first voltage output instruction to the first charging module and the second charging module Step 306: the first charging module and the second charging module receive the first current output instruction and the first voltage output instruction Step 308: the first charging module outputs the second voltage and the second current to the rechargeable battery and transmits a second voltage output value and a second current output value to the central control module while the second charging module outputs the third voltage and the third current to the rechargeable battery and transmits a third voltage output value and a third current output value to the central control module Step 310: the central control module detects that the difference between the second voltage output value and the first voltage is smaller than the predetermined voltage value, and then the central control module transmits a fourth current output instruction, in which the fourth current equals the first current minus a predetermined current value, to the first charging module Step 312: step 310 (or step 311) is performed repeatedly, and the first and second charging modules stop supplying power and finish charging when the first current is smaller than 3 amps

CHARGING SYSTEM ON CONSTANT CURRENT MODE AND METHOD THEREOF

BACKGROUND OF THE INVENTION

Field of the Invention

The present invention relates to a charging system, and particularly to a charging system on constant current mode and the method thereof.

Description of Related Art

Industries and technologies benefit people, and people enjoy the convenience brought by invention. Convenient technologies enhance the qualities of the lives. However, more and more problems are coming one after another, for example ecological damage and energy crisis while the technologies have been developed over a long period of time. This enforces people to have no choice but to face it. In order to maintain earth's ecology and people's sustainable living, energy saving and environment protection are very imperative, such that environment protection technologies have been developed.

Take the transportation as an example. The transportation has developed from the bicycle or the oxcart early in the agricultural age to the motorcycle, the automobile and the airplane in the recent industrial age, so as to shorten the path and the time needed by the shipping. The motorcycle and the automobile depend upon the oil (petrol) to maintain mechanical power, which in the long-term results in irreversible problems for instance energy crisis such as oil shortage, supply chain shortage that further causes the rise of the energy price and even air pollution. People live miserably. Therefore, developing low pollution low energy consumption green transportation is the one and only way. The electric car is one of the current more popular green transportations.

A good charging system must be constructed based on a good charging efficiency. For solar energy power supply system, excess waste of energy resources is avoided and the charging time is shortened. With reference to FIG. 1A, when the conventional charging control system enters a constant voltage charging mode, the charging current thereof is determined and calculated by the controller. The current instruction may be influenced by the voltage feedback value and change hugely. As shown in the right portion of FIG. 1A, the current will shrink rapidly in a curved shape under the constant voltage control state. Furthermore, in a parallel system, mutual pull and drag result in the current instruction's huge swing because of the differences of the modular elements, or the output energy of the modules differs a lot due to the natural balance. Such phenomenon influences the charging efficiency very significantly.

Based on the aforementioned, in order to improve the defects of the conventional techniques, the present invention provides a charging system on constant current mode by reducing the current instruction to adjust and control the voltage not to enter the constant voltage control state.

SUMMARY OF THE INVENTION

In view of the defects of the conventional techniques, the main object of the present invention is to provide a charging system on constant current including a rechargeable battery, a first charging module, a second charging module and a central control module. The central control module is coupled between the first charging module and the second charging module and is coupled to the rechargeable battery. The central control module communicates with the rechargeable battery to obtain a first current and a first voltage required to charge the rechargeable battery. The first charging module is coupled to the first rechargeable battery. The first charging module outputs a second current and a second voltage. The second charging module provides a third current and a third voltage. When the central control module detects that the difference between the second voltage and the first voltage is smaller than a predetermined voltage value, the central control module transmits a fourth current output instruction, in which a fourth current equals the first current minus a predetermined current value.

In order to achieve the object mentioned above, the first charging module may include a first power supply unit, and the second charging module may include a second power supply unit. When the difference between the second voltage and the first voltage is 2 volts, the central control module renders the first current to decrease 2 amps. The central control module detects whether the difference between the second voltage and the first voltage is smaller than the predetermined voltage value or not repeatedly and renders the first current to decrease repeatedly until the fourth current is smaller than 3 amps and the first charging module stops charging. The central control module detects whether the difference between the third voltage and the first voltage is smaller than the predetermined voltage value or not repeatedly to determine whether to reduce the first current again. When the second current is smaller than 3 amps, the first charging module stops charging.

Another object of the present invention is to provide a charging method on constant current mode, the method characterized by comprising steps of: communicating with a rechargeable battery by a central control module to obtain a first current and a first voltage required to charge the rechargeable battery; transmitting a first current output instruction regarding the first current and a first voltage output instruction regarding the first voltage by the central control module to a first charging module and a second charging module; receiving the first current output instruction and the first voltage output instruction by the first charging module and the second charging module; outputting a second voltage and a second current to the rechargeable battery and transmitting an output value of the second voltage and an output value of the second current to the central control module by the first charging module, and outputting a third voltage and a third current to the rechargeable battery and transmitting an output value of the third voltage and an output value of the third current to the central control module by the second charging module; and when the central control module detects that difference between the output value of the second voltage and the first voltage is smaller than a predetermined voltage value, transmitting a fourth current output instruction, in which a fourth current equals the first current minus a predetermined current value, to the first charging module by the central control module.

In order to achieve the another object mentioned above, when the central control module detects that difference between the output value of the third voltage and the first voltage is smaller than the predetermined voltage value, the fourth current output instruction, in which the fourth current equals the first current minus the predetermined current value, is transmitted to the second charging module by the central control module. The predetermined voltage value and the predetermined current value are smaller than the fourth current. The central control module detects whether the difference between the output value of the second voltage and the first voltage is smaller than the predetermined voltage value or not repeatedly and separately to determine whether to reduce the first current again. The first charging module stops charging when the fourth current is smaller than 3 amps.

BRIEF DESCRIPTION OF THE DRAWINGS

FIG. 4 illustrates a flow chart of the steps of the method of the present invention.

The aspects mentioned above and the advantages of the present invention may be readily understood by the following detailed descriptions, and the spirit of the present invention may become apparent from the following descriptions in the specification and the attached drawings below.

DETAILED DESCRIPTION OF THE INVENTION

The present invention will now be described with the preferred embodiments and aspects and these descriptions interpret structure and procedures of the present invention only for illustrating but not for limiting the Claims of the present invention. Therefore, except the preferred embodiments in the specification, the present invention may also be widely used in other embodiments.

Figure 2:
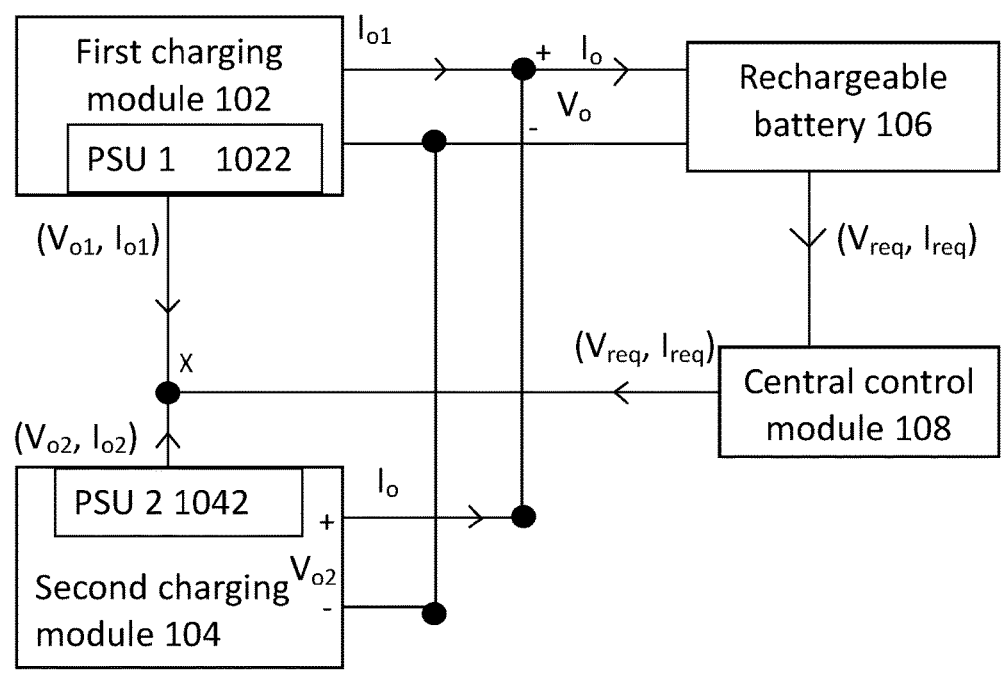
FIG. 2 illustrates a structural diagram of the system of the present invention.
Figure 3:
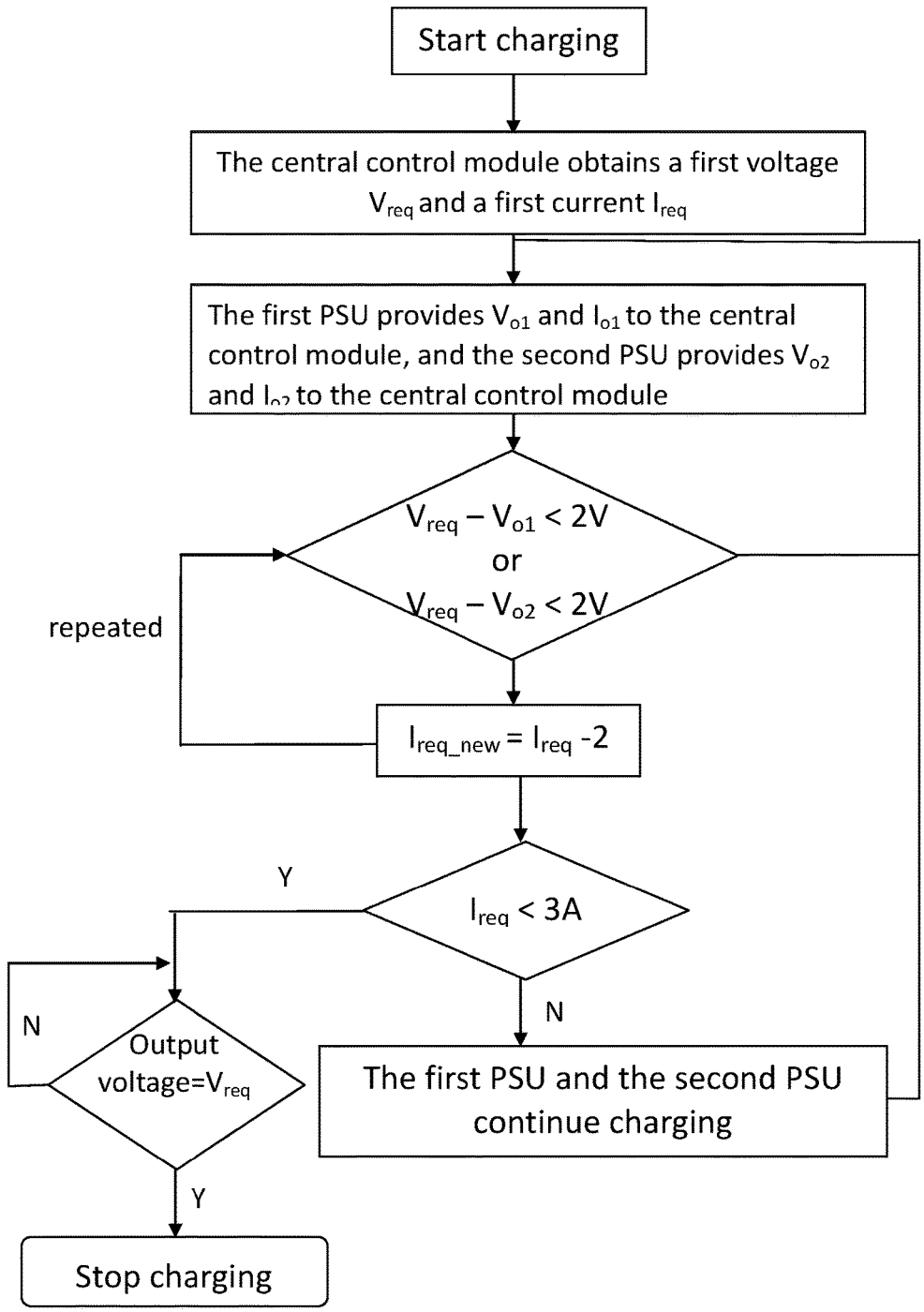
FIG. 3 illustrates a flow chart of parallel output of FIG. 2.

FIG. 2 illustrates a structural diagram of the charging system of the present invention. The system 100 includes a rechargeable battery 106, a first charging module 102, a second charging module 104 and a central control module 108. The rechargeable battery 106 is coupled to the first charging module 102 while the central control module 108 is coupled between the first charging module 102 and the second charging module 104 and coupled to the rechargeable battery 106. The first charging module 102, the second charging module 104 and the rechargeable battery 106 are connected to each other in parallel, and will be illustrated in the following description as parallel connection. It should be appreciated that the internal electronic elements/modules of the system of the present invention are not limited to the arrangement shown in the drawings which only provides one of the applicable arrangements, and can be adjusted according to actual demands.

In one embodiment, the central control module 108 is coupled to a retrieve node X between the first charging module 102 and the second charging module 104, and the central control module 108 communicates with BMS of the rechargeable battery 106 to obtain a first voltage $V_{req}$ and a first current $I_{req}$ required to charge the rechargeable battery 106.

In this embodiment, the first charging module 102 includes a first power supply unit (PSU1) 1022 while the second charging module 104 includes a second power supply unit (PSU2) 1042 as shown in FIG. 2. Detailedly speaking, the first charging module 102 is coupled to the second power supply unit 1042 of the second charging module 104 through the first power supply unit 1022. The first power supply unit 1022 provides a second current $I_{o1}$ and a second voltage $V_{o1}$, and the second power supply unit 1024 provides a third current $I_{o2}$ and a third voltage $V_{o2}$ as shown in FIG. 2. The second current $I_{o1}$ and the second voltage $V_{o1}$ are transmitted to the retrieve node X while the third current $I_{o2}$ and the third voltage $V_{o2}$ are transmitted to the retrieve node X. The central control module 108 obtains the second voltage $V_{o1}$ or the third voltage $V_{o2}$ from the retrieve node X and compares it with the first voltage $V_{req}$.

Figure 1A:
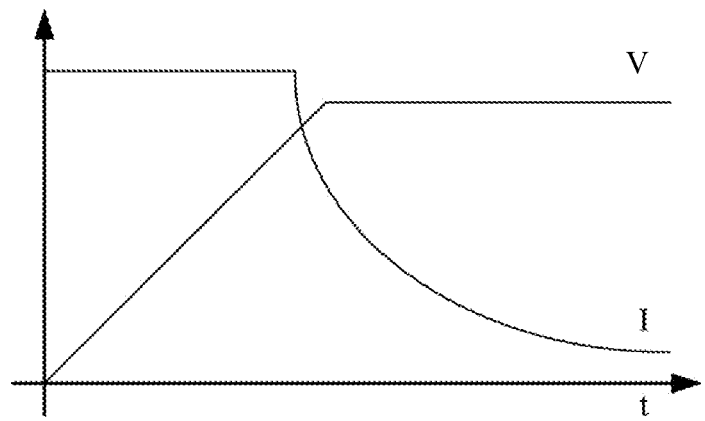
FIG. 1A illustrates a conventional charging curve diagram.
Figure 1B:
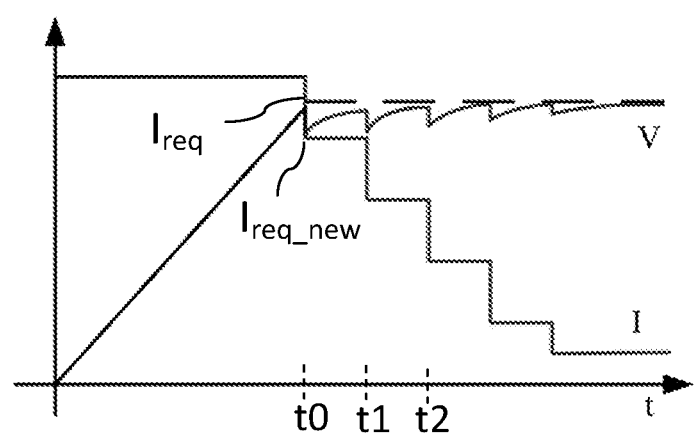
FIG. 1B illustrates a charging curve diagram of the present invention.

Moreover, when the central control module 108 detects that the first voltage $V_{req}$ minus the second voltage $V_{o1}$ is smaller than a predetermined voltage value $V_d$ ($V_{req}-V_{o1}<V_d$) or the first voltage $V_{req}$ minus the third voltage $V_{o2}$ is smaller than the predetermined voltage value $V_d$ ($V_{req}-V_{o2}<V_d$), the central control module 108 will reduce the first current $I_{req}$ with fixed proportion to form a fourth current $I_{req\_new}$. For example, referring to FIGS. 1B and 2 at the same time, when the central control module 108 detects that $V_{req}-V_{o1}<2$ ($V_d=2$) volts or $V_{req}-V_{o2}<2$ ($V_d=2$) volts, the first current $I_{req}$ will be instructed to decrease 2 amps, such that the system 100 will not enter the constant voltage control state. With reference to FIG. 1B, during the initial period of the instruction of reducing the first current $I_{req}$ (such as the initial period of t0 in FIG. 1B), the voltage will be downgraded slightly at the same time but will subsequently be upgraded slightly (such as the later period of t0 in FIG. 1B). When the central control module 108 detects that $V_{req}-V_{o1}<2$ volts or $V_{req}-V_{o2}<2$ volts again (for instance t1 in FIG. 1B), the first current $I_{req}$ will be instructed to decrease 2 amps again (for example t1~t2 in FIG. 1B). The voltage is controlled through reducing the current repeatedly and separately to avoid entering the constant voltage control state (as shown in FIG. 1). Finally, when the first current $I_{req}$ is smaller than 3 amps, the first and second charging modules 102, 104 stop supplying power and finish charging; otherwise, the first and second charging modules 102, 104 will continue charging. It should be noted that the predetermined voltage value $V_d$ and the predetermined current value $I_d$ should be smaller than the output value of the fourth current $I_{req\_new}$. It should be appreciated by the person having ordinary skill in the art that the decrease ranges of the voltage and the current are not limited to the embodiments mentioned above and can be modified based on the actual demands and the whole structures.

FIG. 4 illustrates a flow chart of the charging steps on constant current mode in accordance with one embodiment of the present invention, which can be viewed together with the elements in FIG. 2. The procedures described herein provide examples of different steps. Although specific orders and sequences are disclosed, the order of the steps of the procedures can be modified unless otherwise specified. Therefore, the procedures are illustrated as an example and may be performed with different orders. Even some of the steps may be performed at the same time. Furthermore, not every execution includes the same steps. The embodiments described herein may omit one or more steps. The present invention may also include other steps or procedures. The method 300 may be performed by the system 100. Therefore, the following steps are mainly performed by the system 100 in the following description. FIGS. 1B and 2 may be viewed together in order to clearly understand the present invention. The system 100 may be cooperated with the conventional elements if necessary to perform the present invention. The method 300 may include the following steps:

Step 302: the central control module 108 communicates with the rechargeable battery 106 to obtain the first current $I_{req}$ and the first voltage $V_{req}$ required to charge the rechargeable battery 106.

Step 304: the central control module 108 transmits a first current $I_{req}$ output instruction and a first voltage $V_{req}$ output instruction to the first charging module 102 and the second charging module 104.

Step 306: the first charging module 102 and the second charging module 104 receive the first current $I_{req}$ output instruction and the first voltage $V_{req}$ output instruction.

Step 308: the first charging module 102 outputs the second voltage $V_{o1}$ and the second current $I_{o1}$ to the rechargeable battery 106 and transmits a second voltage $V_{o1}$ output value and a second current $I_{o1}$ output value to the central control module 108 while the second charging module 104 outputs the third voltage $V_{o2}$ and the third current $I_{o2}$ to the rechargeable battery 106 and transmits a third voltage $V_{o2}$ output value and a third current $I_{o2}$ output value to the central control module 108.

Step 310: the central control module 108 detects that the difference between the second voltage $V_{o1}$ output value and the first voltage $V_{req}$ is smaller than the predetermined voltage value $V_d$, and then the central control module 108 transmits a fourth current $I_{req\_new}$ output instruction, in which the fourth current $I_{req\_new}$ equals the first current $I_{req}$ minus a predetermined current value $I_d$, to the first charging module 1022.

For example, referring to FIGS. 1B and 2 together, when the central control module 108 detects that $V_{req}-V_{o1}<2$ volts or $V_{req}-V_{o2}<2$ volts, the first current $I_{req}$ will be instructed to decrease 2 amps, such that the system 100 will not enter the constant voltage control state. With reference to FIG. 1B, during the initial period of the instruction of reducing the first current $I_{req}$ (such as the initial period of t0 in FIG. 1B), the voltage will be downgraded slightly at the same time but will subsequently be upgraded slightly (such as the later period of t0 in FIG. 1B). When the central control module 108 detects that $V_{req}-V_{o1}<2$ volts or $V_{req}-V_{o2}<2$ volts again (for instance t1 in FIG. 1B), the first current $I_{req}$ will be instructed to decrease 2 amps again (for example t1~t2 in FIG. 1B). The voltage is controlled through reducing the current repeatedly and separately to avoid entering the constant voltage control state (as shown in FIG. 1).

Step 311: the central control module 108 detects that the difference between the third voltage $V_{o2}$ and the first voltage $V_{req}$ is smaller than the predetermined voltage value $V_d$, and then the central control module 108 transmits the fourth current $I_{req\_new}$ output instruction, in which the fourth current $I_{req\_new}$ equals the first current $I_{req}$ minus the predetermined current value $I_d$, to the second charging module 104. Step 311 may be optional and may also be performed with step 310 at the same time.

Step 312: step 310 (or step 311) is performed repeatedly, and the first and second charging modules 102, 104 stop supplying power and finish charging when the first current $I_{req}$ is smaller than 3 amps.

Based on the aforementioned, the present invention provides a charging system on constant current mode. When the central control module detects that the first voltage of the first charging module or the second voltage of the second charging module minus the required voltage is smaller than the predetermined voltage value, the central control module will reduce the required current with a fixed proportion. The detecting step and the reducing step are repeated to avoid entering the constant voltage control state and prevent the current from being influenced by the voltage feedback value and changing hugely.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown in the block diagram. There may be intermediate structure between illustrated components. The components described or illustrated herein may have additional inputs or outputs that are not illustrated or described.

The elements mentioned in different embodiments may be a single circuit, or part of or all of the elements may be integrated in a single circuit. Therefore, different elements described in the claims may correspond to partial functions of one or more circuits.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the present invention. It is intended that all such modifications and alterations are included insofar as they come within the scope of the present invention as claimed or the equivalents thereof.

What is claimed is:

1. A charging method on constant current mode, comprising steps of:
    communicating with a rechargeable battery by a central control module to obtain a first current and a first voltage required to charge said rechargeable battery;
    transmitting a first current output instruction regarding said first current and a first voltage output instruction regarding said first voltage by said central control module to a first charging module and a second charging module;
    receiving said first current output instruction and said first voltage output instruction by said first charging module and said second charging module;

outputting a second voltage and a second current to said rechargeable battery and transmitting an output value of said second voltage and an output value of said second current to said central control module by said first charging module, and outputting a third voltage and a third current to said rechargeable battery and transmitting an output value of said third voltage and an output value of said third current to said central control module by said second charging module; and when said central control module detects that difference between said output value of said second voltage and said first voltage is smaller than a predetermined voltage value, transmitting a fourth current output instruction, in which a fourth current equals said first current minus a predetermined current value, to said first charging module by said central control module.

2. The method of claim 1, further comprising: when said central control module detects that difference between said output value of said third voltage and said first voltage is smaller than said predetermined voltage value, transmitting said fourth current output instruction, in which said fourth current equals said first current minus said predetermined current value, to said second charging module by said central control module.

3. The method of claim 1, further comprising:
when said central control module detects that said difference between said output value of said second voltage and said first voltage is 2 volts, said central control module renders said first current to decrease 2 amps as said fourth current.

4. The method of claim 1, further comprising:
said central control module detects whether said difference between said output value of said second voltage and said first voltage is smaller than said predetermined voltage value or not repeatedly and separately to determine whether to reduce said first current again.

5. The method of claim 4, wherein said first charging module stops charging when said fourth current is smaller than 3 amps.

6. The method of claim 2, wherein said central control module renders said first current to decrease 2 amps when said difference between said output value of said third voltage and said first voltage is 2 volts.

7. The method of claim 6, wherein said central control module detects whether said difference between said output value of said third voltage and said first voltage is smaller than said predetermined voltage value or not repeatedly and renders said fourth current to decrease repeatedly and separatedly until said fourth current is smaller than 3 amps and said second charging module stops charging.

8. The method of claim 1, wherein said predetermined voltage value and said predetermined current value are smaller than said fourth current.

9. The method of claim 1, wherein said first charging module is coupled to said rechargeable battery.

10. The method of claim 1, wherein said second charging module is coupled to said rechargeable battery.

11. The method of claim 1, wherein said central control module is coupled to said rechargeable battery, said first charging module and said second charging module.

12. The method of claim 1, wherein said first charging module includes a first power supply unit.

13. The method of claim 1, wherein said second charging module includes a second power supply unit.

* * * * *